(12) United States Patent
Thorpe, III et al.

(10) Patent No.: US 9,019,869 B2
(45) Date of Patent: Apr. 28, 2015

(54) SYSTEM AND METHOD TO SUPPRESS VOICE PROMPTS IN SIP CALLS

(71) Applicant: Avaya Inc., Basking Ridge, NJ (US)

(72) Inventors: Kenneth Paul Thorpe, III, Murphy, TX (US); Tate Reimer, Wylie, TX (US); Christopher Haun, Richardson, TX (US)

(73) Assignee: Avaya Inc., Basking Ridge, NJ (US)

( * ) Notice: Subject to any disclaimer, the term of this patent is extended or adjusted under 35 U.S.C. 154(b) by 178 days.

(21) Appl. No.: 13/707,691

(22) Filed: Dec. 7, 2012

(65) Prior Publication Data
US 2014/0160995 A1  Jun. 12, 2014

(51) Int. Cl.
*H04L 12/18* (2006.01)
(52) U.S. Cl.
CPC ............ *H04L 12/18* (2013.01); *H04L 12/1818* (2013.01)

(58) Field of Classification Search
CPC .............. H04L 67/306; H04L 65/1006; H04L 65/1069
See application file for complete search history.

(56) References Cited

U.S. PATENT DOCUMENTS

2006/0239247 A1* 10/2006 Postmus .................. 370/352
2010/0250771 A1*  9/2010 Chen et al. ............... 709/231

* cited by examiner

*Primary Examiner* — John Blanton
(74) *Attorney, Agent, or Firm* — Maldjian Law Group LLC; John Maldjian; Alexander D. Walter

(57) ABSTRACT

System and method to enable selective suppression of an audible indication in a SIP-based call, the method including: receiving, by a SIP conferencing server, a message from a caller to initiate a SIP-based call, wherein the message comprises a header section; searching the header section for a predetermined header; if the predetermined header is found, determining a field and a corresponding field value from the predetermined header; and storing the field value in a memory, wherein the stored field value is specific to the field and to the caller.

15 Claims, 4 Drawing Sheets

100

SYSTEM AND METHOD TO SUPPRESS VOICE PROMPTS IN SIP CALLS

BACKGROUND

1. Field of the Invention

Embodiments of the present invention generally relate to providing notifications during a SIP call, and, in particular, to a system and method for suppressing audio prompts and notices that are redundant with other prompts and notices available to a sufficiently-enabled SIP user agent.

2. Description of Related Art

An end-terminal client in an electronic telecommunications conference ordinarily has full capabilities of informing a user about conditions of the conference via a graphical user interface ("GUI"). Upon an occurrence of certain events such as entering an electronic telecommunications conference, the user additionally may receive an audio prompt that inform the user about a state of the conference (e.g., that the user joined the conference).

For example, a conferencing system such as the Avaya Aura™ may initiate a call to the user, and the user then receives an audio prompt to enter DTMF digits to confirm entry into the conference. However, an advanced client already may be aware that a conference call is being made, via standard messaging defined by RFC 4575, which provides an entire status of the conference. In this example, the additional audio prompt requesting that the user confirm entry after answering the call is not needed. Causing the user to hear unnecessary audio prompts, and forcing the user to provide an unnecessary action (e.g., twice acknowledging entrance into a conference) results in a frustrating user experience. Therefore, a need exists to suppress unnecessary user prompt and unnecessary actions by users, in order to provide less distraction to a user, and ultimately improved customer satisfaction.

SUMMARY

In one embodiment, a method to enable selective suppression of an audible indication in a SIP-based call includes: receiving, by a SIP conferencing server, a message from a caller to initiate a SIP-based call, wherein the message comprises a header section; searching the header section for a predetermined header; if the predetermined header is found, determining a field and a corresponding field value from the predetermined header; and storing the field value in a memory, wherein the stored field value is specific to the field and to the caller.

In another embodiment, a method to enable selective suppression of an audible indication in a SIP-based call includes: sending to a callee, by a SIP conferencing server, an invitation to join a SIP-based call; sending to the callee, by the SIP conferencing server, a query whether the callee will join the SIP-based call; receiving a query response, by the SIP conferencing server, the query response comprising a header section; searching the header section for a predetermined header; if the predetermined header is found, determining a field and a corresponding field value from the predetermined header; and storing the field value in a memory, wherein the stored field value is specific to the field and to the callee.

In another embodiment, a method to selectively suppress an audible indication in a SIP-based call includes: recognizing, by a SIP conferencing server, a reason to provide an audible indication to a participant in a SIP-based call; recalling a datum from a memory coupled to the SIP conferencing server, wherein the datum indicates whether the audible indication to the participant should be suppressed; and if the datum is true, suppressing the audible indication to the participant.

Additionally, there are other prompts and audible responses such as: conference muted, lecture mode enabled, etc. which may be desirable to suppress on clients with enhances UIs that display conference information as notified via RFC 4575 messaging. Thus, this solution is not limited to any specific prompts.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
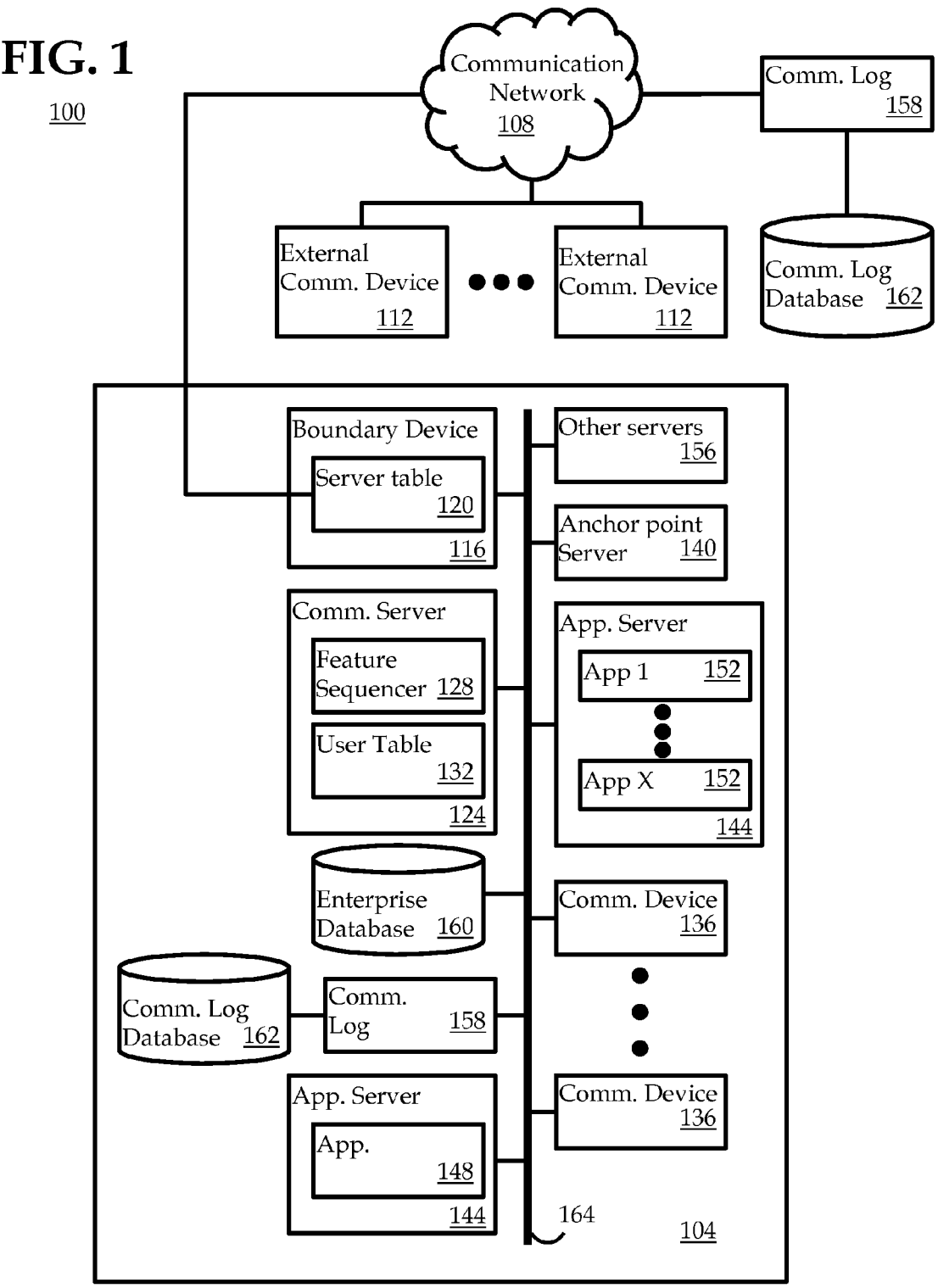
FIG. 1 is a block diagram depicting of a system that us usable in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize audible prompts and notifications at a sufficiently enabled SIP UA.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents ("UAs") without having to know each of the unique device addresses or phone numbers.

IETF RFC-4575 further describes a SIP protocol useful for conferencing applications, in particular a conference event package for tightly coupled conferences using SIP, along with a data format used in notifications for the conference event package. The conference event package allows users to subscribe to a conference Uniform Resource Identifier ("URI"). Notifications are sent about changes in the membership of this conference and optionally about changes in the state of additional conference components.

Users or any other addressable entities in a SIP framework are identified by Universal Resource Identifiers (URI). Each such Internet-style address (for example, sip: johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered UDP port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Embodiments in accordance with the present invention are usable with SIP-based communications systems. In SIP-based calls, a SIP conferencing server such as server 144 of FIG. 1 may control the sending of prompts and notices to a SIP UA such as device 112 of FIG. 1, which are then audibly presented to the user of the SIP UA. However, often the SIP UA may already include sufficient capability either to render such prompts and notices unnecessary, or to be able to present such prompts and notices to the user of the SIP UA in a non-audible manner. Audible presentation of prompts, notices and the like (generically, "audible indications") may be distracting to an audio conference if they are unnecessary or if non-audible methods are available to present the prompts and notices. Therefore, a system and method are presented which suppresses audible indications for sufficiently capable SIP UAs. Capabilities of a SIP UA that may facilitate embodiments in accordance with the present invention may include: having a coupled display screen capable of displaying textual messages; and a processor programmed to produce a textual message on the display screen, the textual message being responsive to a datum of information derived from the SIP-based call.

In some known systems, a SIP conferencing server may be configured to use a user-agent header to determine which clients are sufficiently capable SIP UAs. In contrast, embodiments in accordance with the present invention provide an ability for a SIP UA to explicitly identify which prompts and notices should be delivered to the SIP UA and which prompts and notices should be suppressed. Certain prompts and notices may be delivered both audibly and non-audibly if they are sufficiently important or if the user so desires. Furthermore, embodiments remove any ambiguity arising from having to infer from user-agent headers whether the SIP UA is sufficiently capable.

Embodiments in accordance with the present invention embed information and/or commands into header fields in one or more SIP messages. The embedded information may be embedded by a SIP user agent to inform a SIP conferencing server whether pre-determined audio prompts, or pre-determined sets of audio prompts, are to be played or not to be played when certain actions are performed by a predetermined SIP element that is handling the call. For example, this may include whether or not to play a confirmation prompt based upon whether or not the header information includes the header field, and the value associated with the header field.

A new SIP header usable with embodiments in accordance with the present invention is herein referred to as "P-Conference." For example, the "P-Conference" header may include the following fields, which take on Boolean values:

dialoutconfirmation=true|false
suppressprompts=true|false

Additional fields may be provided, corresponding to individual user prompts, user confirmations (or sets or subsets thereof), and/or notifications of other data that may be sent via RFC-3261 or RFC-4575 for which it may be desirable to suppress such prompts or confirmations at sufficiently-capable SIP UA terminals. Default values may be provided and/or provisioned for each SIP UA. For instance, "suppressprompts" may have a default value of false. Control of the suppression, including identifying what prompts, confirmations, notifications and the like can be suppressed, whether any prompts, confirmations, notifications and the like may not be suppressed, whether they default to suppressed or unsuppressed, and changes thereto, may be configured (i.e., provisioned) by an administrator.

Figure 2:
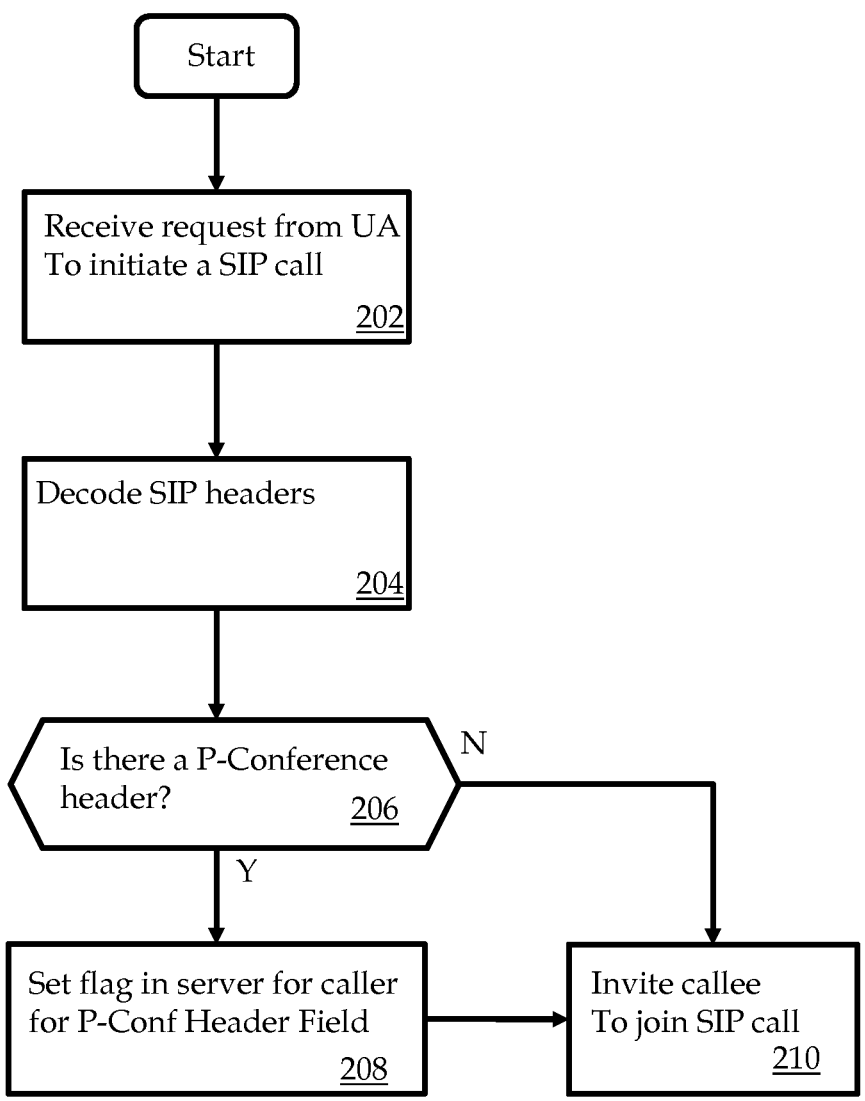
FIG. 2 illustrates at a high level of abstraction a process to handle a request from a caller to establish a call, in accordance with an embodiment of the present invention.

FIG. 2 illustrates a process 200 that is useful for illustrating a caller initiating a call using an advanced Voice over Internet Protocol ("VoIP") client on a SIP UA, in accordance with an embodiment of the present invention. In particular, the caller sends a SIP INVITE message to a conferencing server (e.g., Avaya Aura). The INVITE message includes a header such as "P-Conference: dialoutconfirmation=true, suppressprompts=true." At step 202, the SIP conferencing server receives the INVITE message from the SIP UA.

Next, at step 204, the SIP conferencing server decodes the SIP headers of the INVITE message received at step 202, and at step 206 searches for a P-Conference header within the INVITE message. If the result of step 206 is negative (i.e., no P-Conference headers found), then control of method 200 passes to step 210, at which the SIP conferencing server sends the invitation to the callee. If the result of step 206 is positive, then control of method 200 passes to step 208.

At step 208, the SIP conferencing server decodes the P-Conference header fields to determine which notification permissions are being set and what values they are being set to. A notification permission may include, for instance, that the caller SIP UA does not need to receive commands from the SIP conferencing server which would cause audible indications at the calling SIP UA terminal for the event indicated by the P-Conference header. The SIP conferencing server may assign values to appropriate storage in a memory coupled to the SIP conferencing server (e.g., by setting flags in memory) in order to store the values or status of the notification permissions. If there are additional P-Conference headers in the INVITE header, control of method 200 may revert back between steps 206 and 208 as many times as necessary to process all of the P-Conference headers. Once step 208 has completed for all of the P-Conference headers, control of method 200 passes to step 210, at which the SIP conferencing server sends the invitation to the callee.

Figure 3:
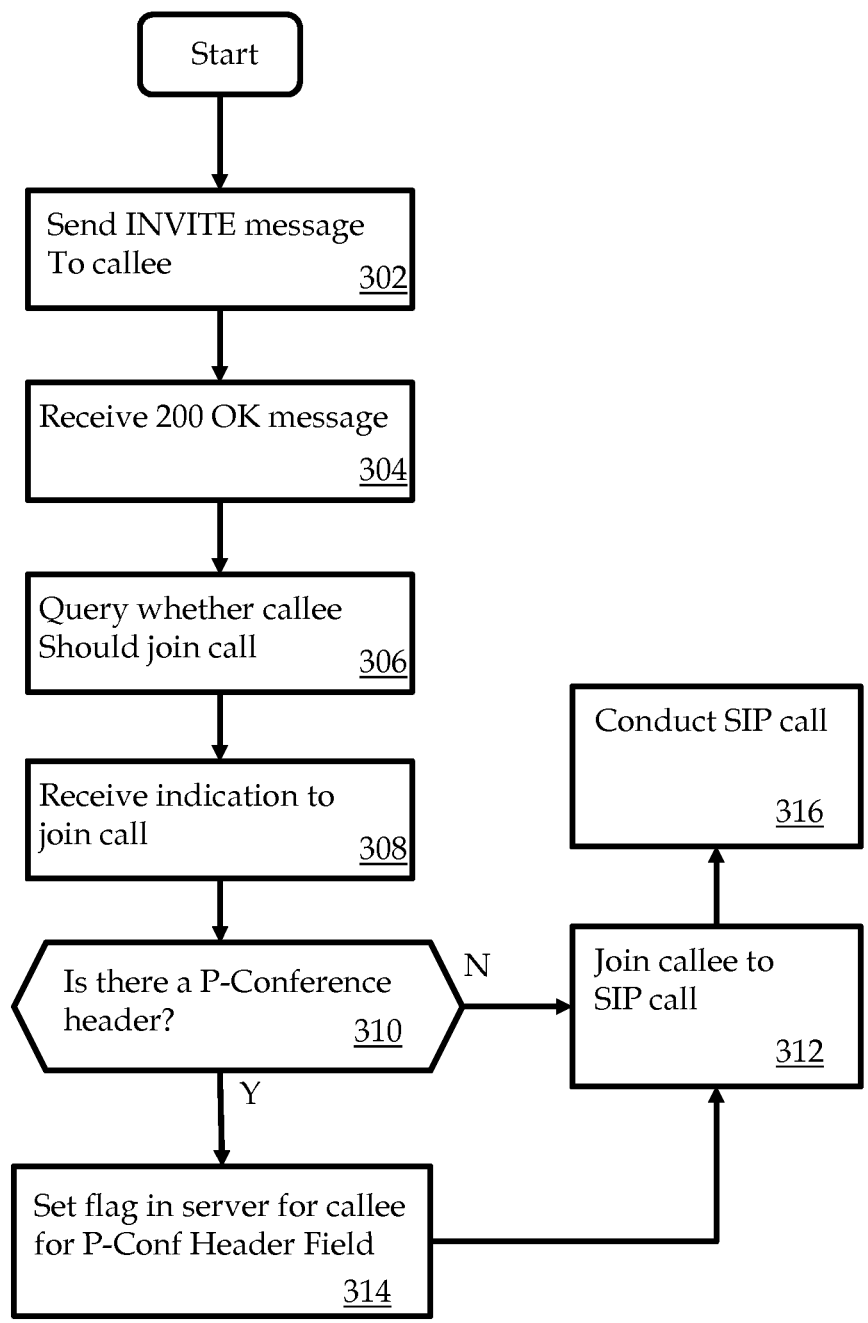
FIG. 3 illustrates at a high level of abstraction a process to join a callee to a call, in accordance with an embodiment of the present invention.

FIG. 3 illustrates at a relatively lower level of abstraction the process 210 that may be performed in order to invite the callee to join the call. Process 210 begins at step 302, at which the SIP conferencing server sends an INVITE message to the callee. The SIP UA client ordinarily should respond to the INVITE with a "200 OK" message within a predetermined time limit.

Next, at step 304, the SIP conferencing server receives the "200 OK" message sent by the SIP UA client.

Next, at step 306, the SIP conferencing server may send a query to the callee SIP UA client in order to prompt the user to provide an indication whether the callee will join the conference. This prompt ordinarily prevents answering machines and people that wish not to join a conference from joining the conference.

Next, at step 308, the SIP conferencing server receives a response to the query sent during step 306. Control of method 210 then passes to step 310, at which the response from the callee is parsed and analyzed.

In the response sent by the callee, embodiments in accordance with the present invention may include one or more "P-Conference" headers as described herein. During step 310, the response is parsed and analyzed for any P-Conference headers. If no P-Conference headers are found, control of method 210 passes to step 312.

However, if the outcome of step 310 is positive (i.e., P-Conference headers are found in the response), control of method 210 passes to step 314, at which the SIP conferencing server will set to an appropriate value one or more data in a memory (e.g., Boolean flags), in order to store the state indicated by the P-Conference headers. Steps 310 and 314 may be repeated as often as necessary in order to process multiple P-Conference headers. During step 314, the SIP conferencing server decodes the header, and Boolean flags specific to the callee UA may be set within a memory coupled to the SIP conferencing server, the flags corresponding to field values decoded from the header.

For example, if the callee SIP UA includes in its response the header and fields "P-Conference: dialoutconfirmation=false, suppressprompts=true", then a memory flag corresponding to "dialoutconfirmation" is set to false, a memory flag corresponding to "suppressprompts" is set to true.

Next, control of method 210 passes to step 312. Any audible indications, etc. will be either sent or suppressed, according to settings derived from the P-Conference headers. For example, if the relevant prompts and notifications are suppressed, the callee SIP UA will be placed immediately into the conference call during step 312. This avoids a redundant step on the part of the user of the callee SIP UA, by not requiring the user to use a DTMF user-input to acknowledge entering the conference that would have been already displayed on an advanced SIP UA client. Next, control of process 210 passes to step 316, at which the SIP call is conducted.

Figure 4:
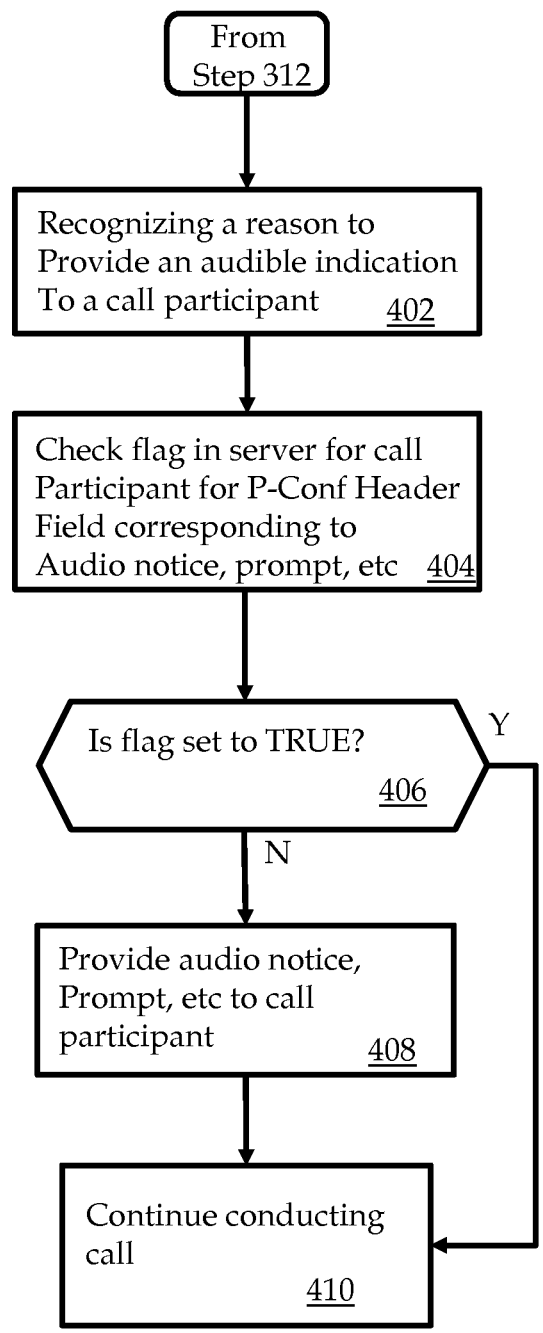
FIG. 4 illustrates at a high level of abstraction a process to conduct an ongoing call, in accordance with an embodiment of the present invention.

Certain prompts or notifications ordinarily may be sent during conduct of the SIP call in step 316. Embodiments in accordance with the present invention may selectively enable or disable audible presentation of such indications to call participants. FIG. 4 illustrates at a lower level of abstraction a process 316 for conducting at least a portion of the SIP call.

Process 316 begins at step 402, at which during the SIP call the SIP conferencing server recognizes a reason to provide an audible indication or the like to one or more call participants. For instance, one participant may have invoked a conferencing feature like call recording, or a status may have changed (e.g., a third party joined the call). Control of process 316 then passes to step 404.

At step 404, the SIP conferencing server may check for the status of one or more flags in the server (or a memory coupled to the server), in order to determine whether the call participant who has a reason to receive an audible indication or the like should in fact receive such an audible indication. The flag(s) are specific to the SIP UA that may receive the notification, and the flag(s) may be individualized for various types of notices, prompts, or the like.

Next, control of method 316 passes to step 406, at which the value of the flag is examined to determine whether it is set to be TRUE, wherein TRUE generally means that the related audible indications should be suppressed. A module in the SIP conferencing server, for instance a module that manages prompts and notifications sent to SIP UAs, will retrieve from a memory coupled to the SIP conferencing server the respective values of Boolean flags for the caller and/or callee SIP UA. If the value of the flag is set to TRUE, control of process 316 passes to step 410 without the audible indications being provided to the SIP UA. At step 410 the conduct of the call continues as normal, which may include returning to step 402 if another reason to provide an audible indication arises, or termination of the call, and so forth.

If the result of step 406 is negative (i.e., the flag is not set to TRUE), then control of process 316 passes to step 408, at which the corresponding audible indication is provided to the respective SIP UA. Thereafter, control of process 316 passes to step 410.

For example, suppose a SIP call has been initiated with "suppressprompts=true" set by the caller. Thereafter during the call, prompts or notifications that indicate an action has completed (e.g., "user muted") or that certain features have been invoked (e.g., "conference being recorded") will not be sent to the caller UA under the assumption that the caller's SIP UA client is capable of reporting the status to the user in a non-audible manner. In this way, the user is not interrupted by hearing unnecessary audible indications. Therefore, there is less risk that the user may not hear a portion of the SIP call itself, or less risk that that the user's concentration will be diverted by unnecessary audible indications. An improved SIP call experience by the user will result.

A capability may be provided to change notification status while a call is in progress, either to suppress prompts and the like, or to restore prompts and the like. For example, a user's preferences may have changed during the call. Notification status may also be changed if a user transfers the call to a different SIP UA, for example if transferring from a desktop client to a less-capable mobile device client, or from the mobile device client to the desktop client.

Embodiments of the present invention include a system having one or more processing units coupled to one or more memories. The one or more memories may be configured to store software that, when executed by the one or more processing unit, allows practicing embodiments in accordance with the present invention, at least by use of processes described herein, including at least in FIGS. 2-4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to enable selective suppression of an audible indication in a SIP-based call, comprising:
receiving, by a SIP conferencing server, a message from a caller to initiate a SIP-based call, wherein the message comprises a header section;
searching the header section for a predetermined header;
if the predetermined header is found, determining a field and a corresponding field value from the predetermined header, wherein the field value comprises information relating to the selective suppression of the audible indication; and
storing the field value in a memory, wherein the stored field value is specific to the field and to the caller.

2. The method of claim 1, further comprising, prior to the determining step, the step of providing a provisionable default value of the stored field value.

3. The method of claim 1, wherein the field in the predetermined header comprises an identification of an audible indication to the caller.

4. The method of claim 3, wherein the audible indication comprises an indication of change in a status of the SIP-based call.

5. The method of claim 3, wherein the audible indication comprises an indication of a confirmation of an action by a participant of the SIP-based call.

6. The method of claim 1, wherein the field in the predetermined header comprises an identification of a plurality of audible indications to the caller.

7. A method to enable selective suppression of an audible indication in a SIP-based call, comprising:
sending to a callee, by a SIP conferencing server, an invitation to join a SIP-based call;
sending to the callee, by the SIP conferencing server, a query whether the callee will join the SIP-based call;
receiving a query response, by the SIP conferencing server, the query response comprising a header section;
searching the header section for a predetermined header;

if the predetermined header is found, determining a field and a corresponding field value from the predetermined header; and storing the field value in a memory, wherein the stored field value is specific to the field and to the callee.

8. The method of claim 7, further comprising the step of providing a provisionable default value of the stored field value.

9. The method of claim 7, wherein a field in the predetermined header comprises an identification of an audible indication to the callee.

10. The method of claim 9, wherein the audible indication comprises an indication of change in a status of the SIP-based call.

11. The method of claim 9, wherein the audible indication comprises an indication of a confirmation of an action by a participant of the SIP-based call.

12. The method of claim 7, wherein a field in the predetermined header comprises an identification of a plurality of audible indications to the callee.

13. A method to selectively suppress an audible indication in a SIP-based call, comprising:

recognizing, by a SIP conferencing server, a reason to provide an audible indication to a participant in a SIP-based call;

recalling a datum from a memory coupled to the SIP conferencing server, wherein the datum indicates whether the audible indication to the participant should be suppressed; and if the datum is true, suppressing the audible indication to the participant.

14. The method of claim 13, wherein the datum is specific to a predetermined participant.

15. The method of claim 13, wherein the datum is specific to a predetermined reason to provide an audible indication.

* * * * *